United States Patent [19]

Slayden

[11] 4,304,554
[45] Dec. 8, 1981

[54] ASTROLOGICAL DEVICE AND METHOD

[76] Inventor: James L. Slayden, 191 Frederick St. #41, San Francisco, Calif. 94117

[21] Appl. No.: 124,882

[22] Filed: Feb. 26, 1980

[51] Int. Cl.³ .............................................. G09B 29/00
[52] U.S. Cl. ..................................................... 434/106
[58] Field of Search ............................. 35/44; 434/106

[56] References Cited

U.S. PATENT DOCUMENTS 1,880,476 10/1932 Ploner ....................................... 35/44
4,251,930 2/1981 Laver .................................... 434/106

OTHER PUBLICATIONS

*Horoscope*, Jul. 1978, vol. 44, No. 7, pp. 57–61, "Astrology Predicts the Next Likely Wat Zones", by Jim Lewis, Pseudonym of James L. Slayden.
*American Astrology*, Sep. 1977, "Locational Astrology MAP Your Way to Happiness", by Jim Lewis, Pseudonym of James L. Slayden.

*Primary Examiner*—William H. Grieb
*Attorney, Agent, or Firm*—Townsend and Townsend

[57] ABSTRACT

A device and method for extracting information as to when the generalized geographical potentials defined at the individual's birth are likely to manifest themselves in time. The device and method provides and utilizes a transparent overlay that is superimposed on a map having loci of constant planetary angularities. The overlay has updated loci of planetary angularities on the same scale as the map. The reference longitude on the overlay is determined such that the local sidereal time at a given location is the same as the local sidereal time at that location at the time of the individual's birth. To maximize the useful information present on a given overlay, the faster moving planets (Sun, Moon, Mercury, Venus, Mars) are progressed while the slower moving planets (Jupiter, Saturn, Uranus, Neptune, Pluto) are transitted.

13 Claims, 5 Drawing Figures

ASTROLOGICAL DEVICE AND METHOD

FIELD OF THE INVENTION

The present invention relates generally to astrology and more specifically to a device and method for displaying and extracting geographically correlated astrological information.

BACKGROUND OF THE INVENTION

Since ancient "Wise Men" first looked to the sky for guidance millenia ago, astrology has asserted that there is some relationship between celestial phenomena and human life, growth, and life events. There have been practicing astrologers, and presumably their clients, in every civilization in time. Today in the United States there are estimated to be 20,000 professional astrologers, approximately 5,000 of those being members of the American Federation of Astrologers. There are two basic areas of astrology to consider. The first relates to the objective extraction and display of astronomical information relating to the movement of the planets as seen from Earth, from which information inferences may be drawn. (In this context, the term "planets" will also be taken to include the Sun and the Moon, but not Earth.) The second is more subjective and relates to an interpretation of various features of the data as they relate to an individual's life experience. Clearly, since data are necessary for an interpretation, these areas are not unrelated. Moreover, depending on the way the information is formatted, different types of interpretations may be available and may further dictate new ways of extracting and formatting data.

Even the most superficial student of the subject (one who has gleaned his total knowledge from a reading of the daily astrology column in the newspaper) is made to recognize that a person's birthdate is somehow significant. Elaborating on this, taking the geocentric positions of the planets in relation to the fixed stars on the ecliptic and in relation to each other (the "aspects") at a given moment in time provides a basic natal horoscope applicable to all people born at that particular time, regardless of location. For this purpose, the precise moment of birth tends often not to be critical.

However, it has also been found that the orientation of the planets with respect to the local horizon is important, so that the precise moment of birth and geographical location become significant. In particular, the ascendant (ASC), the descendant (DSC), the midheaven or upper meridian transit (MH), and the lower meridian transit, called the Imum Coeli (IC) are accepted as being the most powerful positions in the horoscope. Planetary influences tend to be the most powerful if the planet was at one of the aforementioned zones of power, called the "angles" of the chart. A person born with a planet near one of these angles tends to exhibit strongly the qualities associated with the planet. For example, if Mars was at such a position at the person's birth, that person is likely to show aggressive tendencies. The character of the individual planets and their angularities are generally well known to those versed in the astrological arts.

Since the Earth is constantly rotating, the relation of the local horizon to the ecliptic and the planets thereon is constantly varying, temporally and geographically. For example, when the sun is rising in the eastern United States, it is directly overhead in western Europe. While a person is not able to change the time and place of his birth, and thus his natal horoscope, it has been found that a particular planetary influence tends to be maximized at locations on Earth where that particular planet was in fact angular at the moment of the individual's birth. If one moves to a new location, a "relocation" horoscope must be set up, being determined as if the person had been born there in the first place. The aspects, i.e. the relationships of the planets to one another and to the ecliptic, do not change, but the angles, i.e. the relationship of the planets to the horizon and the meridian, do change. Put another way, by traveling, a person can to some extent adjust his horoscope so that it operates as if he been born at a different time of the day. Thus, for example, a person who was born at a time and place when the planet Mars was not angular may find that when he travels to places on earth where Mars was in fact angular when he was born, he will have a greater tendency to become involved in aggressive or violent (Mars-like) activities. Similarly, a person may find that he undergoes life-threatening experiences, when he travels to places where Pluto was angular at birth as Pluto has long been associated with such events.

One of the most useful ways of presenting information relative to such potential relocations is to provide a map of the world and plot thereon loci of planetary angularity. For example, the MH and IC lines for each planet are lines of constant longitude, being spaced by 180° of longitude. The ASC and DSC lines are segments of a smooth curve. Services for the preparation of such maps, customized for a particular individual, are commercially available, being provided under the registered service mark Astro*Carto*Graphy.

While such a map provides information regarding zones of potential planetary power, the information thereon does not have a particular time frame since it is defined solely by the moment of birth. However, it is well established that astrology is a dynamic system, with the positions of celestial bodies at birth being the starting point against which various cycles that are assumed to relate to human growth cycles are measured. Metaphorically, at the moment of birth, a series of clocks having differing periodicities begin running.

Broadly, there are two commonly accepted ways to account for the planetary motion and the resulting changes over time, namely transits and progressions. Transitting information for a given moment in time is conceptually simpler, reflecting the actual positions of the planets at that moment, especially as they relate to natal planetary positions. Progressions, on the other hand, involve various symbolic advances of the planets and angles tied into astronomically relevant ratios and cycles of human maturation and consciousness. The various types of commonly used progressions are related to and derive from the interaction of the rotation of the Earth about its axis and the orbit of the Earth around the Sun. In a "primary" progression, the planets' apparent motions along the diurnal semi-arc arising from the rotation of the Earth are taken as the key motion; approximately four minutes of such rotation is equated to one year of life. In a "secondary" progression, the planets' own discrete motions along the ecliptic after birth are taken as a key, and related in the ratio 1:365.25, or a day to a year. For example, when a person is 40 years old, his secondarily progressed chart would reflect the planetary positions as they actually were 40 days after his birth. In a "solar arc" progression, the Sun's motion is taken as the key; all angles and planetary positions are advanced at the ratio of one day's solar motion equal to one year.

The use of progressions and transits in relocation work is rarely done since the calculations are formidably cumbersome.

SUMMARY OF THE INVENTION

The present invention provides a device and method for extracting information as to when the generalized geographical potentials defined at the individual's birth are likely to manifest themselves in time. The present invention makes available information that was previously unavailable due to the extreme complexity of calculation.

Broadly, the present invention provides and utilizes a transparent overlay that is superimposed on a map having loci of constant planetary angularities. The overlay has updated loci of planetary angularities on the same scale as the map. The reference longitude on the overlay is determined such that the local sidereal time at a given location is the same as the local sidereal time at that location at the time of the individual's birth. To maximize the useful information present on a given overlay, the faster moving planets (Sun, Moon, Mercury, Venus, Mars) are progressed while the slower moving planets (Jupiter, Saturn, Uranus, Neptune, Pluto) are transitted.

With respect to the transitting and progressed information, positions displayed are calculated for actual rise, using right ascension and declination, rather than for the rise of ecliptic intercept. With respect to the progressed information, secondary progression has been found to provide the most useful and accurate information. At variance with usual practice, it has been determined that the progression of the midheaven is best carried out according to mean solar progression rather than utilizing the equation of time which accounts for the fact that the Sun and the Earth move angularly relative to one another at different rates during the year.

The present invention makes it possible to extract information in the framework of the natal midheaven coordinates for any location by aligning the overlay directly over the map. Additionally, information in the framework of progressed angles may be obtained by aligning the progressed Sun midheaven line on the overlay with the natal Sun midheaven line on the map.

For a further understanding of the nature and advantages of the present invention, reference should be made to the remaining portions of the specification and to the attached drawings.

DETAILED DESCRIPTION OF THE INVENTION

Figure 1:
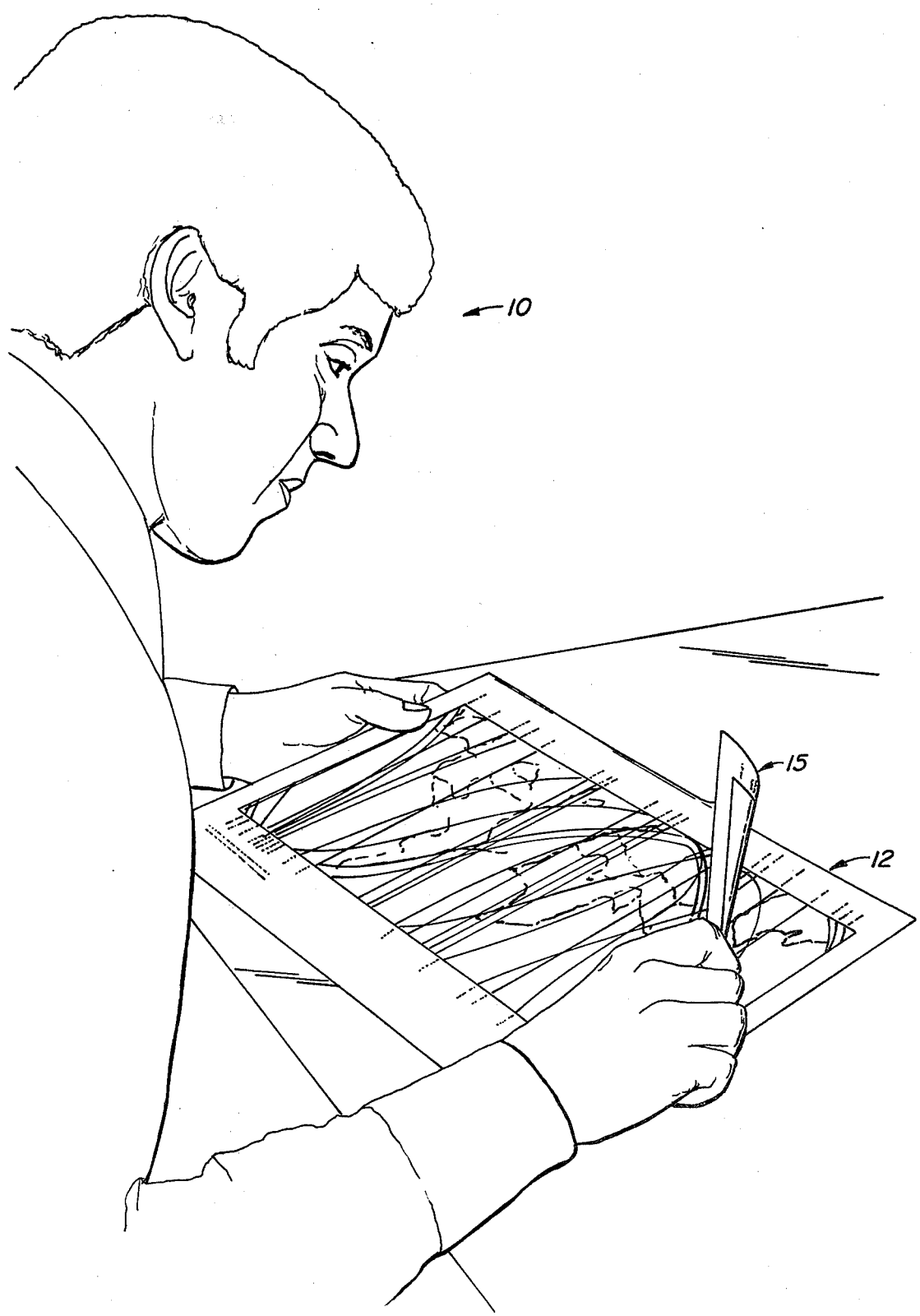
FIG. 1 is a perspective view of a user superimposing an overlay on a map to practice the present invention.

FIG. 1 is a perspective view showing a user 10 utilizing a map 12 and a translucent overlay 15 according to the present invention. Overlay 15 is preferably made from a plastic tracing material that is transparent with respect to objects in contact with it. The operation of the present invention is best understood with particular reference to the precise nature of the markings on map 12 and overlay 15.

Figure 2:
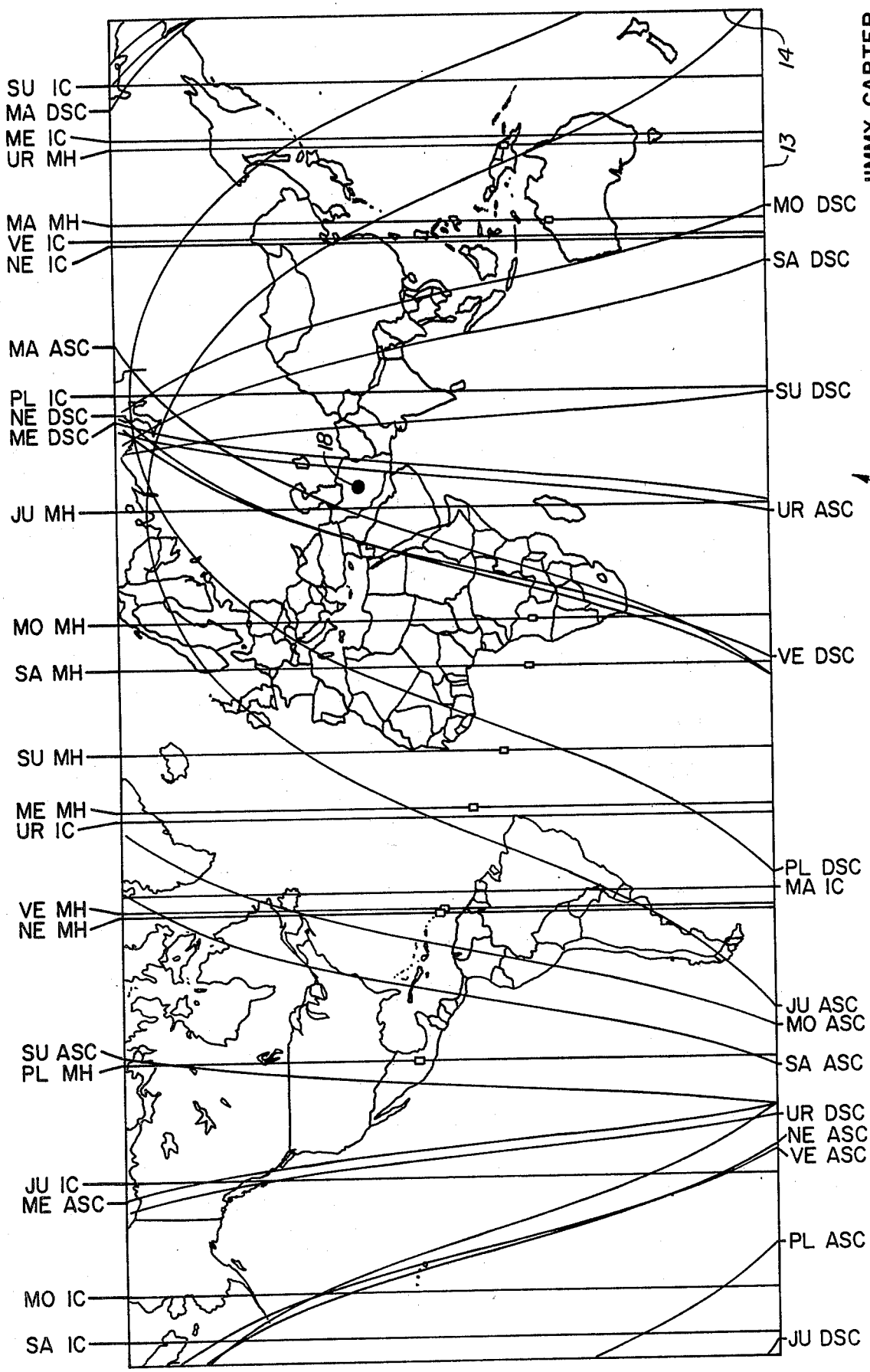
FIG. 2 is a plan view of a particular map for a first subject.

FIG. 2 is a plan view of map 12 showing lines of planetary influence superimposed on a map of the world. Map 12 has respective longitude and latitude scales 13 and 14. The lines are loci of constant planetary angularity for a given moment in time (birth of the subject). In particular, each planet has lines corresponding to the four angularities that are considered most significant, namely the midheaven, the ascendant, the Imum Coeli, and the descendant. A planet is at the midheaven (MH) when it is making its upper meridian transit. A planet is on the ascendant (ASC) when it is bodily on the horizon and moving progressively into sight. A planet is on the Imum Coeli (IC) when it is opposite the midheaven, i.e. making its lower meridian transit. A planet is on the descendant (DSC) when it is on the horizon and moving out of sight. For astrological purposes, the term "planets" includes the Sun and the Moon in addition to the eight planets not including Earth.

Superimposed on map 12 are lines joining all positions on earth wherein a given planet is at one of the above defined angles at a given moment for which the map is drawn. For definiteness map 12 is drawn for Oct. 1, 1924, 13:00 GMT, the generally accepted birth time of James Earl Carter, 39th President of the United States. The following abbreviations are used for the planets:

SU—Sun
MU—Moon
ME—Mercury
VE—Venus
MA—Mars
JU—Jupiter
Sa—Saturn
UR—Uranus
NE—Neptune
PL—Pluto For example, a line labeled SU MH is a line going through all places on Earth where the Sun was at the midheaven (i.e. local solar noon) at the given time. On map 12, the SU MH line runs through Iceland and passes just off the west coast of Africa, showing it to be local noon in those places at the moment for which the map is drawn.

The MH and IC lines are lines of constant longitude, separated by 180° of longitude. For convenience, map 12 is drawn according to a Mercator projection so that the MH and IC lines are straight lines. The map is centered at the Greenwich meridian so that virtually all significant populated land masses on Earth are shown in one piece. Map 12 may cover the entire world, or may be limited to geographical regions of interest. In the preferred embodiment, the polar regions are not shown since they are unlikely places of prolonged residence for most people. However, due to the many crossing of lines in the polar regions, the polar regions would likely be zones of great astrological power.

The interpretations of planetary angularities are relatively standard, although a certain amount of variation occurs, depending on the particular person making the interpretation. A succinct summary of the qualities of the various planetary angular positions and the significance of possible intersections of various of the planetary lines is found in a book entitled *Astro\*Carto\*Graphy*, (1976). By way of illustration, excerpts will be taken from the referenced book when particular examples are discussed. It is anticipated that reference to any one of a number of standard astrology texts would provide similar information.

Figure 3:
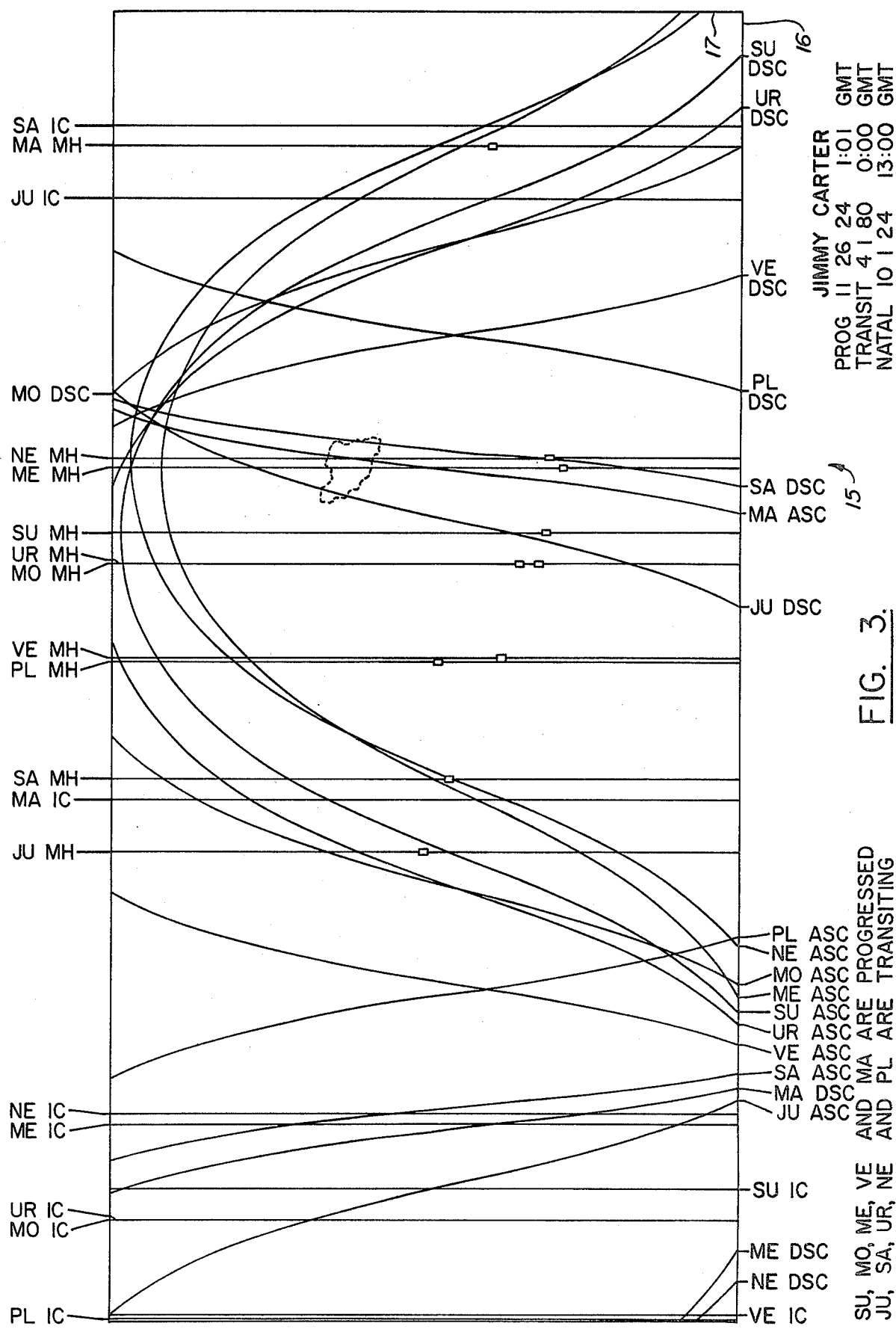
FIG. 3 is a plan view of a transparent overlay for practicing the present invention in conjunction with the map of FIG. 2.

FIG. 3 is a plan view of overlay 15 for a person born at the time on which map 12 is based and updated to Apr. 1, 1980. Overlay 15 has respective longitude and latitude scales 16 and 17 commensurate with scales 13 and 14 of map 12. The slower moving planets, Jupiter, Saturn, Uranus, Neptune, and Pluto, are drawn with actual planetary positions as of the Apr. 1, 1980 data relative to the geographical correlates assigned in map 12. The faster moving planets, the Sun, the Moon, Mercury, Venus, and Mars are progressed according to a secondary progression wherein planetary motions after the Oct. 1, 1924 birth time have been moved by one day's actual motion per year since Oct. 1, 1924. Thus for Apr. 1, 1980, $55\frac{1}{2}$ days of motion are added so that the progressed information is representative of actual planetary positions as of Nov. 26, 1924. All of these planetary lines are drawn with respect to the longitudinal scale such that the local sidereal time at a given location on Earth is the same as the local sidereal time at that location at the time represented by map 12. Put another way, the vernal equinox (the intersection between the celestial equator and the ecliptic) is placed over the same longitude on the overlay that it was over at the time of birth. The planetary positions represented on overlay 15 are calculated on the basis of true rise rather than ecliptic intercept. This accounts for the fact that some of the planets do not lie directly on the ecliptic but may have a latitude of several degrees away from it. Thus, even though a given degree of the ecliptic may be on the horizon at a given location, a planet at that degree on the ecliptic, but with a celestial latitude relative thereto, would be on the horizon at a different location.

It is immediately apparent from a perusal of map 12 that a vast amount of information is presented. When the information of overlay 15 is also taken into consideration, the total amount of information is greatly increased. To focus the discussion for illustrative purposes, it should be noted that the particular map is taken for a person who has become President of the United States. With respect to a subject who has become a head of state, it has been discovered that these individuals tend to become embroiled in controversy at locations where the planet Mars was angular at their birth. With respect to Mars (MA), it is stated:

"Mars' power is intense, and should be respected and used with caution. Under Mars, you tend to be boistrous, opportunistic, masterful, dominating, courageous, and overcome by passions like jealousy and anger. Sporting and engineering ability come out under Mars, and one is boastful of one's scars, to whose numbers some may be added— Mars is accident-prone, temper, violence, passion, sex and other biological urges are here more powerful, much the opposite of Venus's love and fondness, and even marriage is contentious under Mars."

This type of analysis has been done for several Presidents of the United States, past and present. For example, in the case of Franklin D. Roosevelt, his natal MA ASC IC line passes through the Hawaiian Islands, very near to Pearl Harbor. Similarly, each of the respective maps for Presidents Kennedy, Johnson, and Ford has a Mars line passing through or near Vietnam.

Turning once more to map 12 for James Carter, it will be noted that the MA ASC line passes through East Africa and Iran. With respect to Mars on the ascendant (MA ASC), it is stated:

"Here you become the 'macho' image, seeking to compete, are physically stronger, active and rash, seem courageous, yet clumsy and boisterous. You look for confrontations, and woe to those who afront you under a rising Mars. . . . You carry a big stick and assert that actions speak louder than words, so that here is best for athletic success, while there is a recklessness that insures your share of the bumps."

Concentrating on Iran, marked on the world map with a large circular dot 18, it will be noted that several lines pass through this country, namely the MA ASC line, the UR ASC line, the ME DSC line, and the JU MH line, with the JU MH line crossing the MA ASC line quite near the capital of the country. Making additional reference to the above-referenced book, with respect to a Mars-Jupiter crossing, it is stated:

"The symbol for this combination might be the Roman soldier. It is imperialistic, masculine, militant and vigorous, with a respect for authority and uniformity, as well a delight in athletics, sport, competition and power. There is raw courage, ability to 'take arms against the sea of troubles,' though many of these troubles may be self-created. . . . You come to resemble the Hemingwayesque he-man, seem to have money to burn, though no savings, and go through your own and others' resources hungrily, though there is obvious, virile ability to earn or restore them, and extravagance, coarseness, expediency and opportunism manifest. For some, this is where religious convictions demand forceful conversion of the infidels."

As stated above, the particular details of the interpretation of a given angularity (or angularities) may differ somewhat in tone, but the general conclusion is unmistakable, namely that Iran is a potential trouble spot for the president having the particular planetary configurations illustrated on map 12.

However, map 12, standing alone, does not have a time scale, having been defined at the moment of James Carter's birth. Nevertheless, when the information on overlay 15 is correlated with the information on map 12, certain tendencies become clear. The outline of Iran has been superimposed in phantom on overlay 15 of FIG. 3 to facilitate comparison and use with map 12 of FIG. 2.

Consider first overlay 15 alone. The progressed MA ASC line remains present in Iran. Normally the progressed motion corresponding to $55\frac{1}{2}$ years would have carried the Mars line eastward, perhaps into India. However, Mars was retrograde shortly before James Carter's birth, and only became direct shortly before, so that at his birth Mars was moving very slowly. Therefore, inspection of overlay 15, standing alone, indicates that Iran would remain a trouble spot for a significant period. Additionally, it is noted that progressed MA ASC line crosses the transiting NE MH line. With respect to a Mars-Neptune crossing, it is stated:

"All things considered, this may be the most undesirable place to be, as here, the aggression of Mars is mixed with the uncertainty of Neptune. There may be illness, ... unprovoked attacks from strangers, addiction,to drugs, and sexuality seems to take all sorts of unpleasant and weird forms. Paranoia and neurosis may found themselves on an essentially, but subtly, hostile environment. Fears have a nasty way of coming true here, and victimization by society or its lower elements may occur. . . . Sex murders, executions and sordid realities seem to constantly intrude under this combination, and there is appetite for sensationalism and the bizarre."

Naturally, such an interpretation is not ironclad, but rather is representative of the likelihood of unfortunate occurrences.

Turning next to a superposition of overlay 15 on map 12, the transiting JU DSC line on the overlay passes over the natal Mars-Jupiter crossing on the map. This is probably strongest aspect on the map, and thus tends to be intensified by the transiting Jupiter line. Additionally, the Mars-Neptune crossing on the overlay occurs very close to the UR ASC line on the natal map, so that Mars-Uranus and Neptune-Uranus combinations may also be significant.

Additional information in the framework of progressed angles may be extracted by displacing the overlay longitudinally from the map so that the progressed SU MH line is superimposed on the natal SU MH line. With respect to this secondary progression of the midheaven by displacing overlay 15, normally the equation of time would have to be compensated for to make up for the fact that the Sun's mean motion differs from actual ephemeris motion. That is, the progression of the solar midheaven is not uniform over the course of a year, but rather is greater when the Sun is closest to the Earth and lesser when the Sun is farther away. However, it has been discovered experimentally that uniform progression corresponding to mean solar motion provides the best results. This leads to other planetary crossings within Iran. For example, the UR DSC line passes through the Mars-Jupiter crossing, thus intensifying that crossing and further suggesting that Mars-Uranus and Jupiter-Uranus may be significant.

Figure 4:
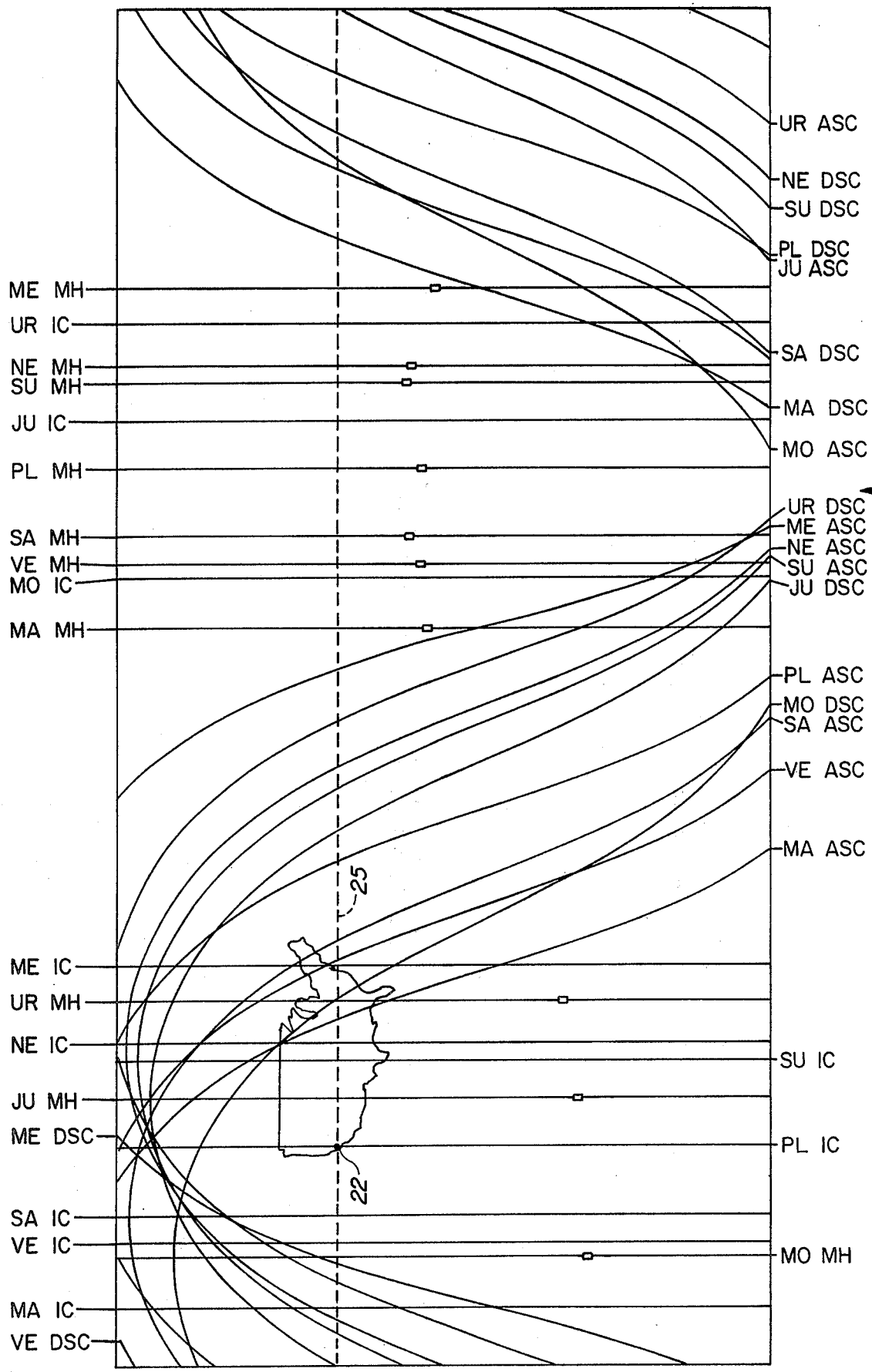
FIG. 4 is a plan view of a particular map for a second subject.

FIG. 4 is a plan view of a map 20 showing lines of planetary influence superimposed on a map of the world. For simplicity, only the United States is outlined. Map 20 has lines joining all positions on Earth where each of the planets was at one of the four angles on July 14, 1913, 6:43 GMT, the generally accepted birth time of Gerald Rudolph Ford, 38th President of the United States. The particular features of map 20 to be discussed below will not relate specifically to the fact that the subject was a head of state, but are more individual in nature. One striking feature of map 20 is that the PL IC line passes directly through San Francisco, Ca. San Francisco is designated by a circular dot 22, and a horizontal line 25, shown in phantom, is drawn through the latitude corresponding to San Francisco. With respect to Pluto, it is stated:

"Plutonic force is perhaps the heaviest of all, and residence, or even travel through this zone can cause total upheaval and change in life. If you are tired of three-dimensional reality, the laws of physics and possibility, go to where Pluto is angular, for here is where miracles can happen, where the odds are continually defied, where firsts and lasts in life are encountered. Pluto burns the fields for new planting, and life takes on a miraculous turn. Other people are seen as truly equal to self, and thus it is rather hard to stand them. Universal truth is seen, and this may expose you to risks of death, that change your perspectives on life, and leave you seeing it with greater depth and clarity."

With respect to Pluto on the IC (PL IC), it is stated:

"Here, the ultimate battle of selfhood and identification is fought with the family, the past, traditions and roots of self, and a final, self-induced birth of a new identity is accomplished. . . . Elderly persons are in danger here, and death may make itself present in your life, though through its force you can come to a new sense of personal meaning and mortality."

Again, map 20, reflecting the planetary positions at the time of Gerald Ford's birth, has no time scale. Although San Francisco might seem to be a place having a generalized potential of danger, there is no way from map 20 alone to predict when such tendencies would become realities, if at all. Moreover the PL IC line is a line of constant longitude, and Portland, Oregon, Seattle, Washington, and Vancouver, British Columbia, are generally on the same longitude as San Francisco.

Figure 5:
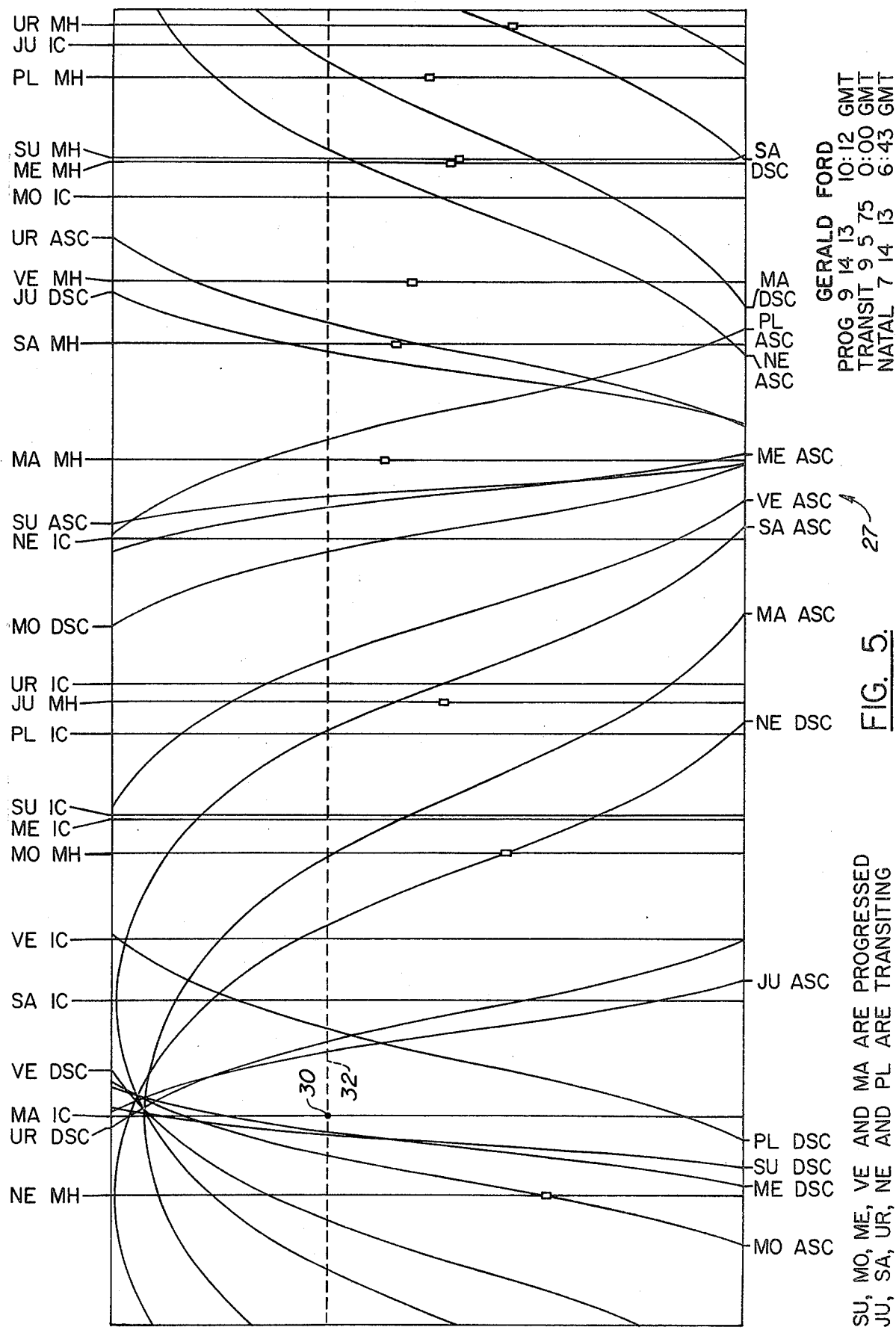
FIG. 5 is a plan view of a transparent overlay for practicing the present invention in conjunction with the map of FIG. 4.

FIG. 5 is a plan view of an overlay 27 having updated information for Sept. 5, 1975. To aid in interpretation, San Francisco is designated by a circular dot 30, and a line 32, in phantom, is drawn through the latitude corresponding to San Francisco. When overlay 27 is superimposed on map 20, the progressed MA IC line lies over the natal PL IC line. Thus, the generally violent and dangerous qualities of both planets tend to reinforce one another. With respect to a Mars-Pluto crossing, it is stated:

"Crimes may be perpetrated, not so much for gain, but to prove yourself, and passion here can be explosive and dangerous. Shocks and dramatic alterations of life's direction, often allied with sexuality, can also be expected here, a rather anti-social location and one in which power is a major personal concern."

Note that the Mars-Pluto crossing (actually a conjunction) still does not pinpoint San Francisco as a more dangerous location than any other location on the same longitude.

However, the present invention provides additional information that has not been heretofore available. It has been discovered that while the influence of the crossings of two or more planetary lines, showing multiple local angularities, are maximum at the location at which they occur, the influence is also significant at other geographical locations having the same latitude.

When crossing of lines on overlay 27 and lines on map 20 are examined, a surprising number are found to occur on virtually the exact latitude of San Francisco. In particular, transiting SA DSC crosses natal MA IC, progressed VE DSC crosses natal MO MH, transiting JU MH crosses natal UR DSC, progressed ME MH and SU MH cross natal MO ASC; and transiting PL MH crosses natal PL DSC, all very near the latitude of San Francisco. With respect to a Mars-Saturn crossing, it is stated:

"One of the least desirable places is here, there is depression of the masculine that leaves you open for victimization, violence, cruelty and sadism. Here is where physical concern for dominant and where a pecking order forms, with others taking frustration out on you, you must find people lower than yourself on whom to vent your rage. Crowds, overexertion and high places pose physical threats, and injury is likely. Women become insistently dominant, and men coarse and cruel."

With respect to a Jupiter-Uranus crossing, it is stated:

"Intellectually, and perhaps in other ways, this is the most exciting place for you to be, your extraordinary good luck zone. This is where wishing makes it so, and you are blessed by unusual good fortune.... You are rescued from difficult circumstances, handle more money than is your custom, and learn to think on a broad scale, seeing each part in its relation to the whole."

With respect to the Pluto-Pluto crossing, the quality of a Pluto angularity is intensified. The Moon-Venus and Moon-Mercury are not particularly germane to dangerous conditions, relating rather to social popularity and the like. The Sun-Moon crossing does not appear to have a major influence, although it may be a vitality indicator.

In view of the above, the conclusion that San Francisco would be a dangerous location for Gerald Ford during the period around Sept. 5, 1975, while not inevitable, is at least somewhat compelling. Actually, historical fact relates that Gerald Ford was the subject of two assassination attempts in or near San Francisco, on Sept. 5, 1975 and Sept. 22, 1975 and that he narrowly escaped injury by remarkable strokes of luck in both cases. Both would-be assassins were women.

In summary, it can be seen that the present invention allows the user to simply and effectively extract a wealth of geographically correlated astrological information, much of which could only be extracted by cumbersome computations, if at all. While the above provides a full and complete disclosure of the preferred embodiments of the invention, various modifications, alternate constructions and equivalents may be employed without departing from the true spirit and scope of the invention. For example, while the planetary angularities (ASC, MH, DSC, and IC) have been taken to be the significant ones, there is by no means unanimity in the astrological community, and other angularities which might be thought important could also be displayed and extracted. Additionally, while the updated information (transits and progressions) was shown as being directly applied to the map having the natal information, the updated information could also be optically projected. Moreover, while the natal information has been described as being directly printed on a map, the same effect could be obtained by displaying the natal information on a second transparent overlay which would be superimposed on a map which had no planetary information printed thereon. This would permit the user to make small relative shifts to account for (or search for) small errors in the time of birth. Therefore, the above description and illustrations should not be construed as limiting the scope of the invention which is defined by the appended claims.

I claim:

1. A device for displaying and permitting the extraction of astrological information relating to geographically correlated planetary influences on a person's life at a particular time comprising:
   a map of geographical locations of interest;
   means defining on said map a first set of loci of constant planetary angularity corresponding to planetary positions at the time of birth of said person;
   a translucent overlay having imprinted thereon a second set of loci of constant planetary angularity, said second set of loci being updated to represent conditions at said particular time, said overlay having longitude and latitude scales commensurate with said map and being capable of longitudinal movement relative to said map, wherein said second set of loci includes a first subset of loci which are derived from progressed information for said particular time relative to said time of birth, and further includes a second subset of loci which are derived from actual planetary positions at said particular time.

2. A device for displaying and permitting the extraction of astrological information relating to geographically correlated planetary influences on a person's life at a particular time comprising:
   means defining a map of geographical locations of interest;
   means defining on said map a first set of loci of constant planetary angularity corresponding to planetary positions at the time of birth of said person; and
   means for superimposing on said map a second set of loci of constant planetary angularity, said second set of loci being updated to represent conditions at said particular time, said means for superimposing permitting said second set of loci to be moved longitudinally relative to said first set of loci on said map.

3. The invention of claim 2 wherein said means for superimposing comprises a translucent overlay having said second set of loci imprinted thereon and having longitude and latitude scales commensurate with said map for direct superposition thereonto.

4. The device of claim 2 wherein said second set of loci includes a subset of loci relating to the Sun, the Moon, Mercury, Venus and Mars, the loci in which subset are derived from progressed information for said particular time relative to said time of birth.

5. The invention of claim 4 wherein said progressed information is determined according to a secondary progression wherein the progressed planetary positions are the actual positions taken at a time after said time of birth that is one day after said time of birth for every year that said particular time is later than said time of birth.

6. The invention of claim 1 wherein said second set of loci includes a subset of loci relating to Jupiter, Saturn, Uranus, Neptune, and Pluto, the loci in which subset are derived from actual planetary positions at said particular time.

7. The invention of claim 5 wherein said first and second sets of loci are calculated from planetary positions taking into account actual rise rather than ecliptic intercept alone.

8. The invention of claim 2 wherein said second set of loci are with respect to a longitude scale such that the local sidereal time at a given location on Earth is the same as the local sidereal time at said given location on Earth at the time of birth.

9. The invention of claim 2 wherein said loci include loci of midheaven angularity, and wherein said map is drawn according to a Mercator projection so that the loci of midheaven angularity are straight lines.

10. The invention of claim 2 wherein said second set of loci includes a subset of loci relating to the Sun, the Moon, Mercury, Venus, and Mars, the loci in which subset are derived from progressed information for said particular time relative to said time of birth wherein progression of the midheaven is carried out according to mean solar progression rather than utilizing the equation of time.

11. A method of extracting astrological information relating to geographically correlated planetary influences on a person's life at a particular time, comprising the steps of:
provideng a map of geographical locations of interest;
superimposing on said map a first set of loci of planetary angularity based on planetary positions at the time of birth of said person;
providing a translucent overlay having scales commensurate with the scales on said map and having imprinted thereon a second set of loci of planetary angularity based on information relating to planetary positions related to said particular time;
superimposing said overlay on said map with the latitude scales in registration; and
longitudinally aligning said overlay with said map to extract said information.

12. The invention of claim 11 wherein said first set of loci includes a locus of natal solar midheaven angularity and wherein said second set of loci includes a locus of progressed solar midheaven angularity, and wherein said step of longitudinally aligning said overlay comprises the step of superimposing said locus of progressed solar midheaven angularity on said locus of natal solar midheaven angularity to extract relationships in the frame of progressed angles.

13. The invention of claim 11 wherein said step of longitudinally aligning said overlay is carried out so that the vernal equinox is placed over the same longitude on the overlay that it was over at said time of birth.

* * * * *